(12) United States Patent
Mosgrove et al.

(10) Patent No.: US 7,123,127 B2
(45) Date of Patent: *Oct. 17, 2006

(54) SYSTEM FOR MANAGING PHYSICAL ASSETS

(75) Inventors: Isaac J. Mosgrove, Salem, OR (US); Teri Lynné Briskey, Monmouth, OR (US); Dirk L. Bellamy, Salem, OR (US); Sean Beebe, Salem, OR (US); Scott D. Westfall, Salem, OR (US); Dean Sinn, Silverton, OR (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/356,655

(22) Filed: Jan. 31, 2003

(65) Prior Publication Data

US 2004/0150508 A1 Aug. 5, 2004

(51) Int. Cl.
*H04Q 1/00* (2006.01)
*G06K 19/00* (2006.01)

(52) U.S. Cl. .................. 340/5.21; 340/5.51; 340/5.73; 340/572.1; 70/389

(58) Field of Classification Search .............. 340/5.21, 340/5.73, 568.1, 5.51, 539.32; 70/389
See application file for complete search history.

(56) References Cited

U.S. PATENT DOCUMENTS

| | | | |
|---|---|---|---|
| 4,616,111 A | 10/1986 | Vasquez | |
| 4,681,504 A | 7/1987 | Welch, Sr. | |
| 4,697,171 A | 9/1987 | Suh | |
| 4,727,368 A | 2/1988 | Larson et al. | |
| 4,760,393 A | 7/1988 | Mauch | |
| 4,808,993 A | 2/1989 | Clark | |
| 4,914,732 A | 4/1990 | Henderson et al. | |
| 4,916,443 A | 4/1990 | Barrett et al. | |
| 4,926,665 A | 5/1990 | Stapley et al. | |
| 4,947,163 A | 8/1990 | Henderson et al. | |
| 4,988,987 A | 1/1991 | Barrett et al. | |
| 4,993,069 A | 2/1991 | Matyas et al. | |
| 5,007,089 A | 4/1991 | Matyas et al. | |
| 5,046,084 A | 9/1991 | Barrett et al. | |
| 5,107,258 A | 4/1992 | Soum | |

(Continued)

FOREIGN PATENT DOCUMENTS

CN 1296112 A 5/2001

(Continued)

OTHER PUBLICATIONS

KeyTrak, www.keytrak.com/markets/auto_features.asp, (18 pages) (printed Jan. 15, 2003).

(Continued)

*Primary Examiner*—Brian Zimmerman
*Assistant Examiner*—Clara Yang
(74) *Attorney, Agent, or Firm*—Klarquist Sparkman, LLP

(57) ABSTRACT

A key management system for controlling access to vehicle keys includes a key set, a key container and an electronic access device. The key set includes vehicle keys to a particular vehicle and a key tag associated with the vehicle keys having an electronically readable identifier. The key container has a key set storage area secured by an electronic lock and a circuit that detects when the key set is stored in the key set storage area. The access device is carried by a user to access the key container, and has a memory that is updated with at least the identifier of the key tag when the key container is successfully accessed.

20 Claims, 10 Drawing Sheets

U.S. PATENT DOCUMENTS

| | | | |
|---|---|---|---|
| 5,140,317 | A | 8/1992 | Hyatt, Jr. et al. |
| 5,245,652 | A | 9/1993 | Larson et al. |
| 5,280,518 | A | 1/1994 | Danler et al. |
| 5,321,242 | A | 6/1994 | Heath, Jr. |
| 5,322,992 | A | 6/1994 | Castleman et al. |
| 5,373,282 | A | 12/1994 | Carter |
| 5,397,884 | A | 3/1995 | Saliga |
| 5,410,301 | A | 4/1995 | Dawson et al. |
| 5,451,757 | A | 9/1995 | Heath, Jr. |
| 5,475,375 | A | 12/1995 | Barrett et al. |
| 5,506,575 | A | 4/1996 | Ormos |
| 5,541,581 | A | 7/1996 | Trent |
| 5,563,579 | A | 10/1996 | Carter |
| 5,602,536 | A | 2/1997 | Henderson et al. |
| 5,612,668 | A | 3/1997 | Scott |
| 5,612,683 | A | 3/1997 | Trempala et al. |
| 5,654,696 | A | 8/1997 | Barrett et al. |
| 5,705,991 | A | 1/1998 | Kniffin et al. |
| 5,710,557 | A | 1/1998 | Schuette |
| 5,719,938 | A | 2/1998 | Haas et al. |
| 5,745,044 | A | 4/1998 | Hyatt, Jr. et al. |
| 5,774,058 | A | 6/1998 | Henry et al. |
| 5,791,172 | A | 8/1998 | Deighton et al. |
| 5,801,618 | A | 9/1998 | Jenkins |
| 5,801,628 | A | 9/1998 | Maloney |
| 5,815,557 | A | 9/1998 | Larson |
| 5,878,613 | A | 3/1999 | Tabacchi et al. |
| 5,881,584 | A | 3/1999 | Brunoski et al. |
| 5,937,065 | A | 8/1999 | Simon et al. |
| 5,942,985 | A | 8/1999 | Chin |
| 6,005,487 | A | 12/1999 | Hyatt, Jr. et al. |
| 6,065,880 | A | 5/2000 | Thompson |
| 6,072,402 | A | 6/2000 | Kniffin et al. |
| 6,075,441 | A | 6/2000 | Maloney |
| 6,097,306 | A | 8/2000 | Leon et al. |
| 6,131,808 | A * | 10/2000 | Pires et al. ............ 340/5.6 |
| 6,195,005 | B1 | 2/2001 | Maloney |
| 6,204,764 | B1 | 3/2001 | Maloney |
| 6,209,367 | B1 | 4/2001 | Hyatt, Jr. et al. |
| 6,232,876 | B1 | 5/2001 | Maloney |
| 6,262,664 | B1 | 7/2001 | Maloney |
| 6,317,044 | B1 | 11/2001 | Maloney |
| D456,852 | S | 5/2002 | Maloney |
| 6,392,543 | B1 | 5/2002 | Maloney |
| 6,407,665 | B1 | 6/2002 | Maloney |
| 6,418,766 | B1 * | 7/2002 | Luebeck ............ 70/368 |
| 6,424,260 | B1 | 7/2002 | Maloney |
| 6,427,913 | B1 | 8/2002 | Maloney |
| 6,472,973 | B1 * | 10/2002 | Harold et al. ........ 340/5.73 |
| 6,501,379 | B1 | 12/2002 | Maloney |
| 6,611,232 | B1 * | 8/2003 | Wunderlich et al. ...... 342/387 |
| 6,737,961 | B1 * | 5/2004 | Flick ............ 340/539.1 |
| 2001/0004235 | A1 | 6/2001 | Maloney |
| 2001/0006368 | A1 | 7/2001 | Maloney |
| 2001/0009397 | A1 | 7/2001 | Maloney |
| 2001/0022552 | A1 | 9/2001 | Maloney |
| 2002/0014961 | A1 | 2/2002 | Maloney |
| 2002/0044055 | A1 | 4/2002 | Maloney |
| 2002/0059043 | A1 | 5/2002 | Maloney |
| 2002/0075154 | A1 | 6/2002 | Maloney |
| 2002/0113706 | A1 | 8/2002 | Prado et al. |
| 2002/0145520 | A1 | 10/2002 | Maloney |
| 2002/0153418 | A1 | 10/2002 | Maloney |
| 2003/0052782 | A1 | 3/2003 | Maloney |
| 2004/0025039 | A1 * | 2/2004 | Kuenzi et al. ............ 713/193 |
| 2004/0128159 | A1 | 7/2004 | McGinn et al. |

FOREIGN PATENT DOCUMENTS

| | | |
|---|---|---|
| DE | 4444913 A1 | 6/1995 |
| DE | 19644052 A1 | 5/1998 |
| DE | 29904431 U1 | 5/1999 |
| EP | 0086617 A2 | 8/1983 |
| EP | 0086617 B1 | 8/1983 |
| EP | 0410024 A1 | 1/1991 |
| EP | 0410024 B1 | 1/1991 |
| EP | 0427188 A2 | 5/1991 |
| EP | 0427188 A3 | 5/1991 |
| EP | 0427188 B1 | 5/1991 |
| EP | 0668421 A1 | 8/1995 |
| EP | 0719599 A1 | 7/1996 |
| EP | 0911475 A1 | 4/1999 |
| EP | 0911475 B1 | 4/1999 |
| EP | 0935041 A1 | 8/1999 |
| EP | 1088958 A2 | 4/2001 |
| EP | 1088958 A3 | 4/2001 |
| FR | 2566823 A1 | 1/1986 |
| FR | 2593310 A1 | 7/1987 |
| FR | 2705116 A1 | 11/1994 |
| FR | 2760874 A1 | 9/1998 |
| GB | 2080383 A | 2/1982 |
| GB | 2280709 A | 2/1995 |
| GB | 2305214 A | 4/1997 |
| GB | 2315804 A | 2/1998 |
| JP | 7-229336 | 8/1995 |
| JP | 10-54166 | 2/1998 |
| JP | 11-71943 | 3/1999 |
| JP | 2001-182388 | 7/2001 |
| JP | 2002-256748 | 9/2002 |
| NL | 8501907 | 8/1987 |
| NL | 191268 | 11/1994 |
| RU | 2186919 C1 | 8/2002 |
| WO | WO 90/10134 | 9/1990 |
| WO | WO 94/17268 | 8/1994 |
| WO | WO 99/39066 | 8/1999 |
| WO | WO 01/02413 | 3/2001 |
| WO | WO 01/25570 | 4/2001 |
| WO | WO 01/86098 | 11/2001 |
| WO | WO 02/45031 | 6/2002 |

OTHER PUBLICATIONS

DisplayKEY, www.supra-products.com/verticals/realestate/products/displaykey.asp, (1 page) (printed Jan. 25, 2003).

iButton Products: iButtons, www.ibutton.com/products/ibuttons.html, (3 pages) (printed Nov. 13, 2003).

* cited by examiner

Typical Key Holder Behavior

Typical Lot Attendant Behavior

Obtain Vehicle Key(s) from Keybox

Key Holder Login and Menu

Check Out KeyPad

Check in KeyPad

Administrator Login and Menu

Import Vehicles

KeyTag Assignment

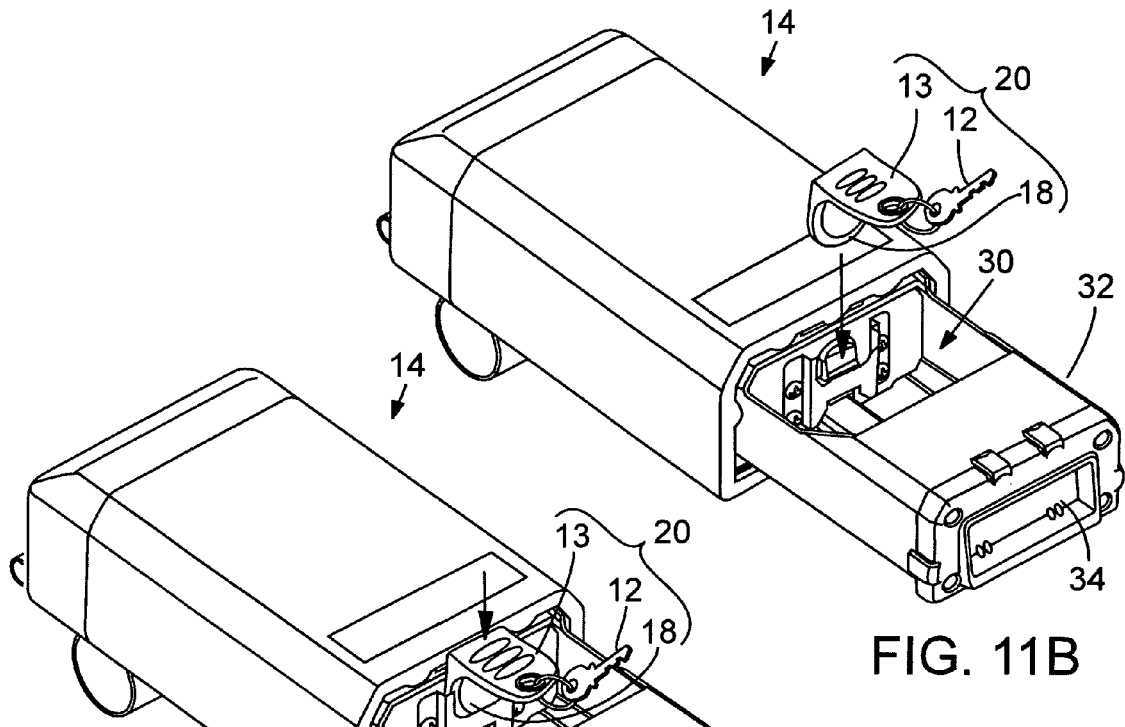
FIG. 11B
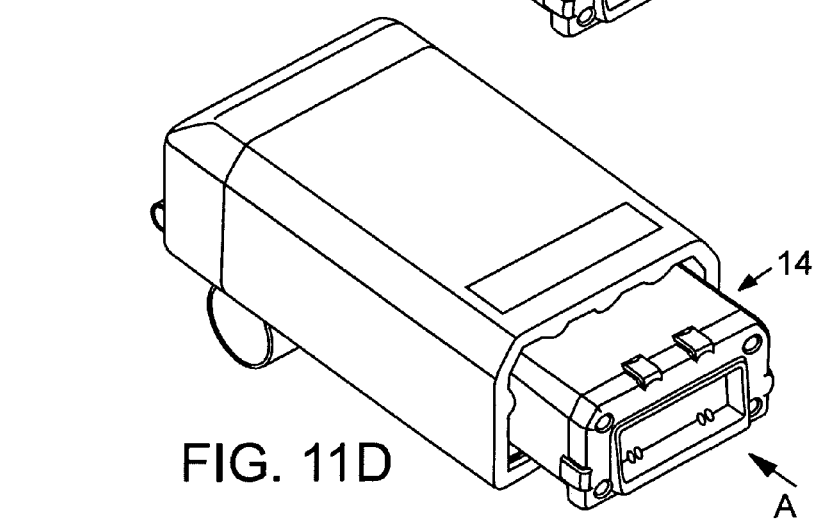
FIG. 11C
FIG. 11D

FIG. 13

Key Advantage User Configuration

Name: Nellie Frost   Login: nellie
Type: Local Administrator   Password: nest
Location: Lot 2

Access Availability
(Check box to allow access)

| System Code | | Name |
|---|---|---|
| ☐Hide | | |
| AAAA | ☐ | Lot 1 – New |
| BBBB | ■ | Lot 2 – New |
| CCCC | ■ | Lot 2 – Service |
| DDDD | ☐ | Lot 3 – New |
| EEEE | ☐ | Lot 3 – USed |
| IIII | ☐ | Lot 3 – Service |

User Parameters
■ Edit Record information
■ Program devices
■ View Reports
☐ View screens only (no editing)

FIG. 14

Key Advantage User Configuration

Name: Frank Snipes   Login: frank
Type: Sales Manager   Password: frapes
Location: Lot 2

Access Availability
(Check box to allow access)

| System Code | | Name |
|---|---|---|
| ☐Hide | | |
| BBBB | ■ | Lot 1 – New |
| CCCC | ☐ | Lot 2 – Service |

User Parameters
☐ Edit Record information
☐ Program devices
■ View Reports
■ View screens only (no editing)

FIG. 15

| Information | Program |

Sales Person 1
Status: Active
PIN: 1122

Access Availability
(Check box to allow access)
Time: From: 8:00 To: 17:00

[Generate PIN]

Renewal: Shift

System Code    Name
☐ Hide
BBBB    ■ Lot 2 – New
CCCC    ☐ Lot 2 – Service

Access Allowed per Device: ☐

Number of Keys Allowed: ☐

Days:
o Sunday
● Monday
● Tuesday
● Wednesday
● Thursday
● Friday
o Saturday

Keys Currently In Use
645598

Group: [          ]

[Save]

FIG. 16

| Information | Program |

Sales Technician 1
Status: Active
PIN: 4321

Access Availability
(Check box to allow access)
Time: From: 6:00 To: 15:30

[Generate PIN]

Renewal: Shift

System Code    Name
☐ Hide
BBBB    ■ Lot 2 – New
CCCC    ☐ Lot 2 – Service

Access Allowed per Device: 25

Number of Keys Allowed: 1

Days:
o Sunday
● Monday
● Tuesday
● Wednesday
● Thursday
● Friday
o Saturday

Keys Currently In Use
645599

Group: [          ]

[Save]

FIG. 17

Information | Program

Tom Smith

Status: Active | PIN: 1234

Access Availability
(Check box to allow access)

Time: From: All Hours

Generate PIN

Renewal: Sunday: 24:00

| System Code | Name |
|---|---|
| ☐ Hide | |
| AAAA | ■ Lot 1 – New |
| BBBB | ☐ Lot 2 – New |
| CCCC | ■ Lot 2 – Service |
| DDDD | ☐ Lot 3 – New |
| EEEE | ■ Lot 3 – Used |
| IIII | ☐ Lot 3 – Service |

Access Allowed per Device ☐

Number of Keys Allowed ☐

Days:
● Sunday
● Monday
● Tuesday
● Wednesday
● Thursday
● Friday
● Saturday

Keys Currently In Use
645568
773252

Group [      ]

Save

FIG. 18

Information | Program

Jim Jones--Lot 3

Status: Active | PIN: 6789

Access Availability
(Check box to allow access)

Time: From: 8:00  To: 19:30

Generate PIN

Renewal: Shift

| System Code | Name |
|---|---|
| ☐ Hide | |
| AAAA | ■ Lot 1 – New |
| BBBB | ☐ Lot 2 – New |
| CCCC | ■ Lot 2 – Service |
| DDDD | ☐ Lot 3 – New |
| EEEE | ■ Lot 3 – Used |
| IIII | ☐ Lot 3 – Service |

Access Allowed per Device ☐

Number of Keys Allowed ☐

Days:
○ Sunday
● Monday
● Tuesday
● Wednesday
● Thursday
● Friday
○ Saturday

Keys Currently In Use
773392

Group [      ]

Save

SYSTEM FOR MANAGING PHYSICAL ASSETS

FIELD

This application relates to asset management and tracking, and more specifically, to managing and tracking physical assets, such as, e.g., keys or other objects, that are secured at remote locations but must be accessed and used by different authorized people for various purposes.

BACKGROUND

Asset management systems, such as key management systems, are known. Effective key management requires that a number of individual keys can be securely stored when not in use, but one or more of the keys can be made available to an authorized user in an efficient manner. Enhanced capabilities of key management systems would include tracking of keys that are in use or missing, as well as the ability to generate reports about activity relating to access of the keys and/or the locked areas unlocked by the keys.

In one type of application, key management systems are used to administer the use of keys for a large fleet of vehicles, e.g., at a car dealership. The dealership expects the system to assist in permitting only authorized individuals, e.g., salespersons, mechanics, managers, etc., to have access to vehicles in its possession, but it does not wish to impede these authorized individuals from conducting business with cumbersome security measures.

According to one current approach, vehicle keys are maintained in a centralized location, e.g., the dealership showroom. In today's larger dealerships, returning from the sales lot to the showroom each time a different key is needed may pose a real inconvenience. Therefore, a salesperson may try to guess all of the vehicles that a sales prospect may be interested in, and then take the keys to these vehicles. The keys may not be returned to the centralized location for some time, because the salesperson is busy or because the salesperson gives the keys to another salesperson who is seeking them. As a result, some keys may be "out of circulation" for an extended period, even though they may not be in actual use.

Some centralized systems are as simple as a key board having hooks on which the keys are hung, thus providing a visual indication of which vehicles are available on the lot based on which keys are present on the board. Another centralized system requires each individual seeking access to login through an attached computer with an ID and a password. Authorized individuals are provided access to a secure drawer with a compartment assigned to the keys for each vehicle in the dealership's inventory. This system records who removes a key from the drawer, the time the key was removed, and the time it was returned, based in part on an electronic identifier attached to each vehicle's keys. One problem with such centralized electronic systems, however, is that when they inevitably fail, the secured keys to an entire inventory of vehicles cannot be accessed until the problem is corrected.

According to another current approach, which is decentralized, the keys are securely stored at or near each parked vehicle. The keys to each vehicle (or at least the ignition key) are secured in a locked key container when not in use. For example, each vehicle can be outfitted with a key box or key container having a conventional lock accessed by a conventional key, such as the present assignee's Indigo® key box. A dealership's collection of key containers might be keyed alike, or might require a small number of different keys.

In any case, theft or loss of one of the keys to the key containers poses a security risk until detected. It is also expensive to retool each lock to accept only a new key that has not been compromised. There are also limits on the number of different new keys that can be made for conventional locks, so a careful thief with a collection of stolen keys still might have access.

There are also drawbacks to using the conventional key container in its intended way. A busy salesperson may forget to replace the keys in the key container for a first vehicle before taking a sales prospect for a test drive in a second vehicle. There is a chance that the salesperson may eventually return both sets of keys, but may return them to the wrong key containers. There is no way to track past accesses with the conventional key container system.

Another type of decentralized system also makes use of remotely located key containers secured by conventional locks, but each user has a custom-cut conventional key capable of accessing each key container. This system is able to track which custom-cut key was used to access which key container, but there is no assurance that the current key user is the assigned user. Loss or theft of the custom-cut key requires all of the key containers to be re-keyed, which is expensive. The key container of this system communicates access information to a centralized location, but this requires a supply of power and associated circuitry that makes this container much more expensive.

It would be advantageous to provide a key management system that addresses some of the drawbacks of the prior systems.

SUMMARY

The asset management system and methods of this application provide advantages compared to prior art approaches.

First, the system and methods of this application can be used under a decentralized approach that allows the keys to be stored at secure locations near each respective vehicle, rather than requiring a user seeking access to first obtain the vehicle keys from a central location that may be far removed from the vehicle that the user seeks to access.

Second, the access device that allows an authorized user to access a key container in which the vehicle keys are secured is a portable electronic device that is preprogrammed with the user's privileges and periodically expires. In addition the user must enter identifying information, such as a PIN code, to authenticate himself before access is allowed. Thus, loss or theft of an access device poses less risk than loss of a conventional key that may provide access to a large number of key containers.

According to one implementation, a key management system for controlling access to vehicle keys includes a key set, a key container and a portable electronic device. The key set includes vehicle keys to a particular vehicle and a key tag associated with the vehicle keys. The key tag has an electronically readable identifier stored on the key tag.

The key container can be located on or near the vehicle. The key container has a key set storage area secured by an electronic lock. The key container can detect the presence of the key tag within the key set storage area. For example, the key tag can have an electrical contact portion that completes a circuit in the key container when the key set is stored in the key set storage area.

The portable electronic access device is carried by a user to access the key container. The access device has a memory that is updated with at least the identifier of the key tag when the key container is successfully accessed and the key set is removed from the key set storage area.

The memory in the access device can also record the approximate time that a successful access was made. The memory of the access device can include stored privileges, and at least some of these privileges can be set to expire periodically.

The access device can be configured to supply the electrical power necessary to operate the circuit of the key container. The system can be configured to require that the user physically connect the access device to the key container to establish a communications link.

The access device can be programmed with access privileges corresponding to the user's identity. The key container is usually programmed to prevent access unless the user validates his identity.

The key container can include a memory that stores, e.g., the identifier of the key tag of the stored key set and/or an access log providing information identifying which users recently accessed the key container, which key tags were accessed and at what times. The memory of the key container can include a lockout list identifying an unauthorized access device or an unauthorized user.

The key container can include an attachment portion shaped to allow the key container to be supported over an edge of a window in the vehicle.

The system can include a central computer and an associated database for use in administration, include assigning privileges to different classes of users, updating information about current inventory to be tracked, tracking activity of access devices, users and vehicles, and allowing certain classes of users to generate and view reports of activity. Users can log into the central computer to reestablish their expired access privileges.

Prior to or during an access event, the user demonstrates that he is authorized, which may include communicating identification information to the access device, e.g., entering a PIN code on a key pad or other similar authentication routine. Once initially authorized, the user may then be asked to select from one of a predetermined group of codes corresponding to the purpose of the access.

With an access device that is programmed to expire periodically, the information stored in the memory of an expired access device can be automatically uploaded to a database before reuse, e.g., at check in, during reauthorization, etc.

BRIEF DESCRIPTION OF THE DRAWINGS

FIG. 11B is a drawing of key container in an open position, FIG. 11C shows the key set as it is being inserted into the key container, and FIG. 11D shows the key container being returned to a closed position.

FIGS. 13–18 are exemplary screen displays showing operational aspects of the key management system.

DETAILED DESCRIPTION

Described below are implementations of an asset management system. In one implementation, the system is configured for management of physical assets and (1) allows article(s) necessary to access a locked object or area, which would include a key or keys, to be securely stored near the object or area in a locked container, (2) allows access to the container with an electronic access device by an authorized user, and (3) allows tracking of access activity.

SYSTEM OVERVIEW

Figure 1:
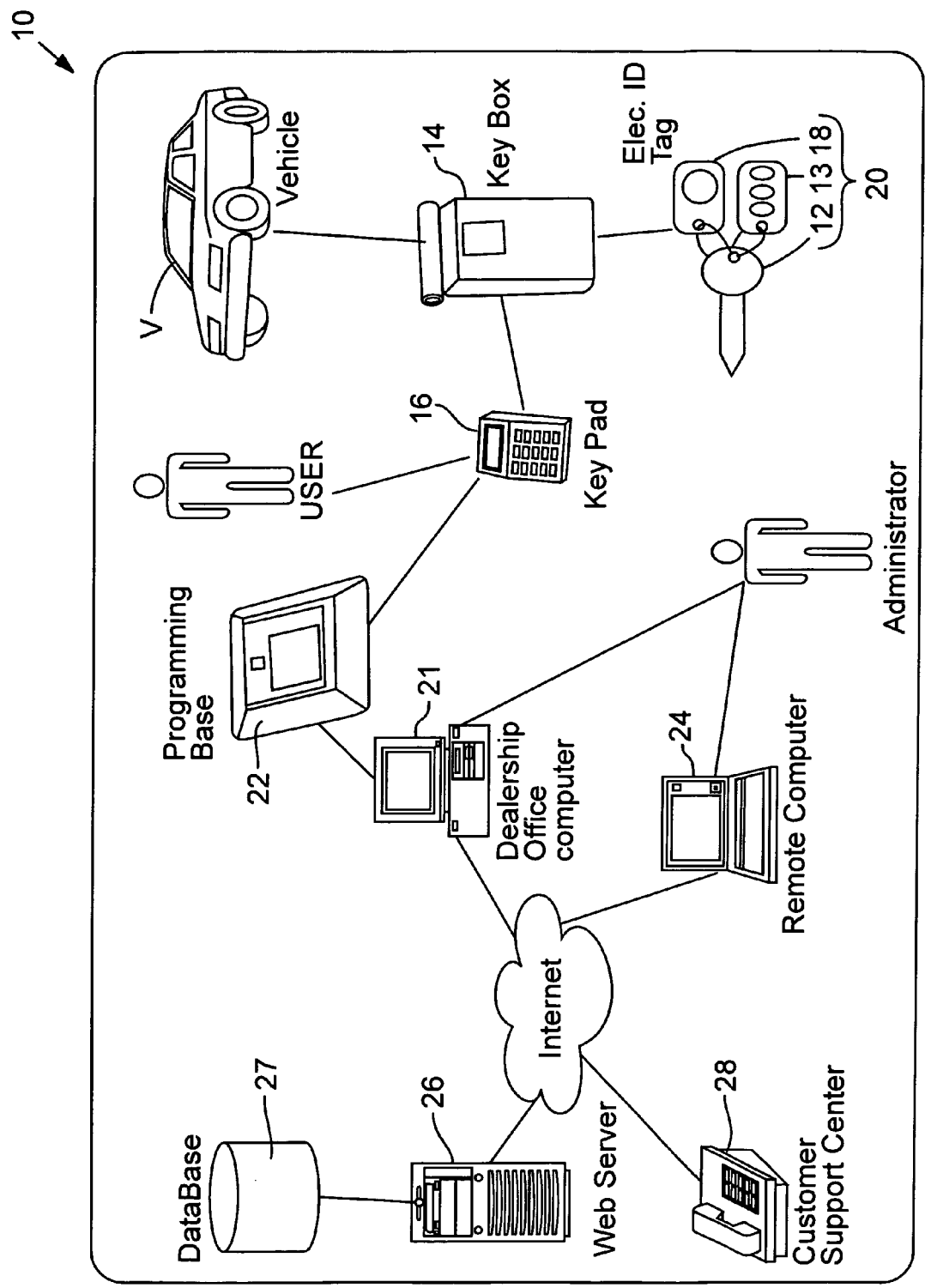
FIG. 1 is a schematic view of a key management system as configured for a car dealership implementation, which includes a key pad assigned to a user, a remotely located key container for securing vehicle keys, a central computer that administers the system, and other components.

An implementation 10 of the key management system is shown schematically in FIG. 1. In the system 10, the articles of interest are keys to motor vehicles, such as the illustrated vehicle keys 12 for a vehicle V. The vehicle keys 12 are secured at or near the respective vehicle in a "key box" or key container 14 that is locked with an electronic lock. The vehicle V is presumably unattended, so a user seeking to access the vehicle in a normal fashion (1) unlocks the key container 14, (2) removes the vehicle keys 12 from the key container 14, (3) uses one of the vehicle keys 12 (or an attached conventional electronic key fob 13) to unlock the vehicle if the vehicle is locked, and (4) if desired, uses the one of the vehicle keys 12 to start the vehicle.

The user unlocks the key container 14 by linking a pre-programmed electronic access device with the key container 14 and successfully demonstrating that the user is authorized to make access to the key container 14, based on, e.g., one or more of the following: the user's identity, the user's pre-assigned privileges, the user's prior activity, the time of day, etc. In the illustrated implementations, the access device is a small, battery-powered, microprocessor-based unit with a memory, a display, a key pad that allows the user to enter information, and input/output capability for receiving programming instructions or communicating information, such as sending a user's PIN to a linked key container 14 that the user wishes to access. One specific access device is the key pad 16 of the type illustrated in FIG. 1.

Assuming that the user's request to access the key container 14 is authorized, the electronic lock of the key container 14 is unlocked and information about the access is recorded in memory, which may include a memory in the key pad 16 and/or a memory in the key container 14. At periodic intervals, e.g., the end of a salesperson's shift, the information stored in memory can be uploaded to a central computer 21 for managing and tracking access activity.

The central computer 21 is programmed for use in administering the system 10, including assigning privileges to different classes of users, updating information about current inventory to be tracked, tracking activity of key pads 16, users and vehicles, and allowing certain classes of users to generate and view reports.

The central computer 21 is linked to a database that stores information for administering the key management system. As illustrated in FIG. 1, the information can be stored in and retrieved from a networked database, such as the database 27 linked through a server 26 via a public network, such as the internet, or a private network.

The central computer 21 would typically be located at a convenient but secure site at the dealership, e.g., in the dealership's central offices. If an access device such as the key pad 16 is used, there is also a programming base 22 connected to the central computer 21 that provides an interface for connecting the key pad 16 and the central computer 21 together to exchange information.

If desired, one or more additional computers, such as the remote computer 24, can also be linked to the system via the internet or other network. For example, the dealership owner may have one such remote computer 24 located at her residence. There may also be implementations in which multiple central computers and/or multiple databases (located onsite or remotely) are networked together to provide a coordinated management system, e.g., in the case of a large auto group with multiple dealerships at different locations. Additionally, an optional system administration channel may be provided, such as a telephone link 28 to live customer support and/or a voice-activated server.

In some implementations, such as is illustrated in FIG. 1, the vehicle keys 12 will be attached to a key tag 18 that includes an electronically stored identifier. When the system 10 is initially configured to include the vehicle V in inventory, unique identification information about that vehicle (e.g., the vehicle's VIN) is recorded in the database associated with the central computer 21 to correlate the vehicle V with the identifier of the assigned key tag 18. The programming base 22 can be configured to include an appropriate reader for the key tag 18. Preferably, the key tag 18 is physically attached to the vehicle keys to form what is referred to herein as a "key set," such as the illustrated key set 20.

Additional details are described below.

Operation

Operation of the system 10 is described below in connection with an exemplary implementation at a vehicle dealership. At any time, the dealership has an inventory of vehicles under its care, which may include both new and used vehicles being offered for sale, as well as vehicles owned by others that have been left at the dealership for service. Vehicles may need to be accessed several times over the course of each business day, e.g., to move them to other locations, to allow potential customers to test drive them, to view their interiors, etc. In a large dealership, the vehicles may be distributed over an extensive area, so keeping each vehicle's keys securely stored, but at a location near the respective vehicle, is desirable.

Salesperson

In the case of its sales force, the dealership desires to give each authorized salesperson privileges to access some or all of the vehicles being offered for sale without unduly interfering with the sales process. There may be reasons, however, to restrict a salesperson's ability to access vehicles, e.g., the salesperson is no longer an employee of the dealership, the salesperson's work shift is over, the salesperson has exceeded a maximum number of vehicle accesses for a given period, or the salesperson is authorized to sell only certain vehicles (e.g., only used vehicles or only a particular make of vehicles).

Figure 2:
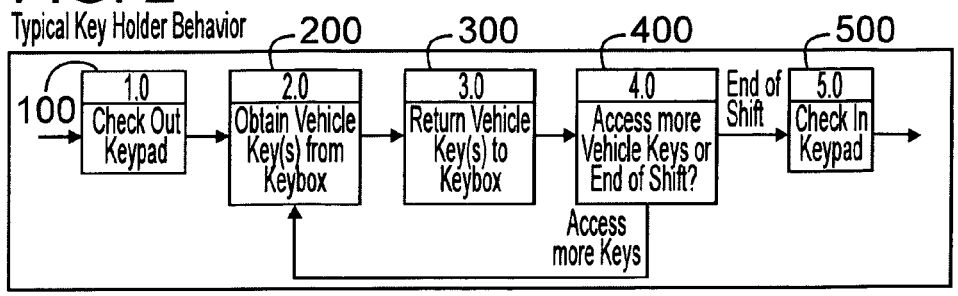
FIG. 2 is a flow chart showing operational aspects of the key management system from the standpoint of a typical user, such as a salesperson.

FIG. 2 is a flowchart showing the steps taken by a typical salesperson over the course of her shift. In step 100, the salesperson logs into the central computer 21 and "checks out" any available key pad 16, which is programmed with appropriate privileges for her status, as described below in greater detail in connection with FIGS. 5 and 6. The salesperson then uses her assigned key pad 16 to make an access to a vehicle, which is probably at a location remote from the central computer (step 200). Following each access, the salesperson normally would then return the key set 20 to the key container 14 and close it (step 300), which returns the key set 20 to a secured state. This process is repeated over the course of the salesperson's shift (step 400). At the end of her shift, the salesperson normally returns to the central computer 21 and "checks in" her assigned key pad 16 (step 500), which allows the information about her activity to be uploaded to the system.

Lot Attendant

Figure 3:
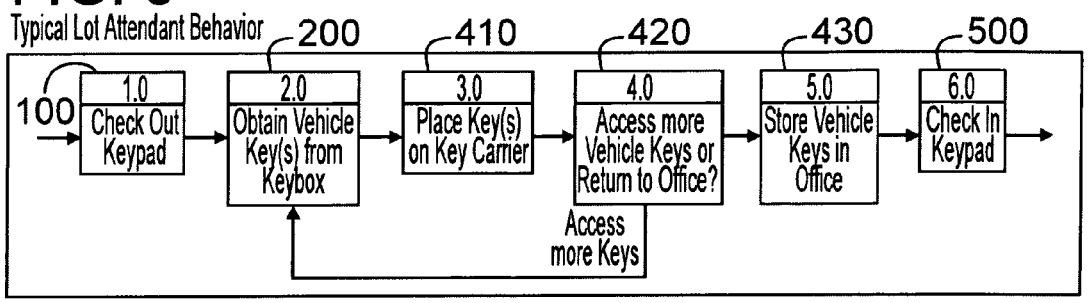
FIG. 3 is a flow chart showing operational aspects of the key management system from the standpoint of another class of user, such as a lot attendant.
Figure 4:
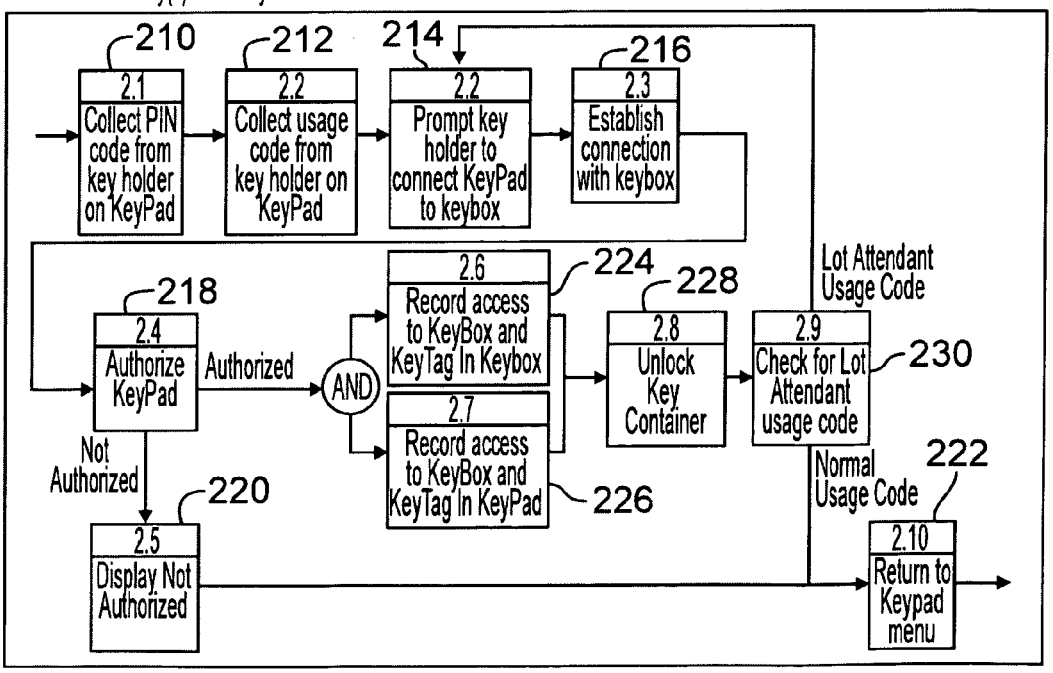
FIG. 4 is a flowchart showing operational aspects of making an access to the key container using the key pad.

FIG. 3 is similar to FIG. 2, and the steps that are the same as in FIG. 1 are identified with the same reference number. In FIG. 3, however, the steps shown are those taken by a typical lot attendant, e.g., at the end of the business day when the key set 20 from each vehicle is collected from each respective key container 14 for storage at a secure location. This precaution can be taken if the dealership desires not to leave the key sets 20 in the key containers while the dealership is unattended.

As in FIG. 1, the lot attendant checks out a key pad 16 (step 100), and uses it to access one of the key containers 14 and retrieve the respective key set 20. The retrieved key set is collected (step 410), and the process is repeated until all desired key sets have been retrieved (step 420). The retrieved key sets are stored in a secure location (step 430), and the lot attendant's key is checked in (step 500).

Key Pad/Key Container Interaction

FIG. 3 is a flowchart showing the sub-steps of step 200, i.e., the steps involved in making an access. The user (which could be a salesperson, a lot attendant or another class of user) has decided to request access to a vehicle having a locked key container 14. The user validates her identity, e.g., by entering her PIN on the key pad 16 (step 210). Assuming that correct identifying information has been entered, the user is then prompted to enter a usage code corresponding to the intended reason she is seeking access (step 212). Exemplary usage codes could include one or more of the following: sales demo, service, body shop, PDI (Preparation, Detail, Inspection), overnight, aftermarket, or retrieving key for central storage.

In step 214, the user is then prompted to link her key pad 16 to the key container 14, in this case by physically connecting the key pad 16 to the key container 14. When an electrical connection between the key pad 16 and the key container 18 is established (step 216), the key container "wakes up" based on electrical power provided from the key pad 16 to circuitry in the key container 14.

In step 218, it is determined whether the key pad 16 is authorized to make the requested access. It is possible to prevent a user from making an otherwise authorized access (i.e., one within the privileges programmed for the user's key pad 16) by identifying the user on a "lock out" list stored in the key container 14.

If the access is not authorized, the key pad 16 indicates this result (e.g., via a displayed and/or audio message) (step 220), and the key pad 16 displays its main menu (step 222).

If the access is authorized, information about the access is recorded in the memory of the key container 14 (step 224) and in the memory of the key pad 16 (step 226). The information recorded in the memory of the key container 14 is stored in the form of an audit trail and may include the user's identification, the usage code, the date and time of the access, and the identification of the key tag 18, if present. The information recorded in the memory of the key pad 16 would usually include identification of the key tag 18 corresponding to the key set 20 in the key container 14, the date and time of the access and the usage code.

Following step 226, the key container 14 is unlocked to allow access to the key set 20 (step 228). The user may then use the key set 20 to unlock the vehicle.

If the user is determined to have lot attendant privileges (step 230), such as indicated by entering the appropriate usage code in step 212, the process returns to step 214 and she is prompted to connect her assigned key pad to the key container 14 for the next vehicle. In this way, the responsible lot attendant may access each key container 14 for multiple cars and collect the respective key sets quickly, e.g., at the end of the business day. The process can be designed to require the lot attendant to reauthorize herself (e.g., by reentering her PIN) after a given time period (e.g., every 10 minutes) and/or after a predetermined number of accesses (e.g., after every 10 accesses).

Checking In/Checking Out a Key Pad

Figure 5:
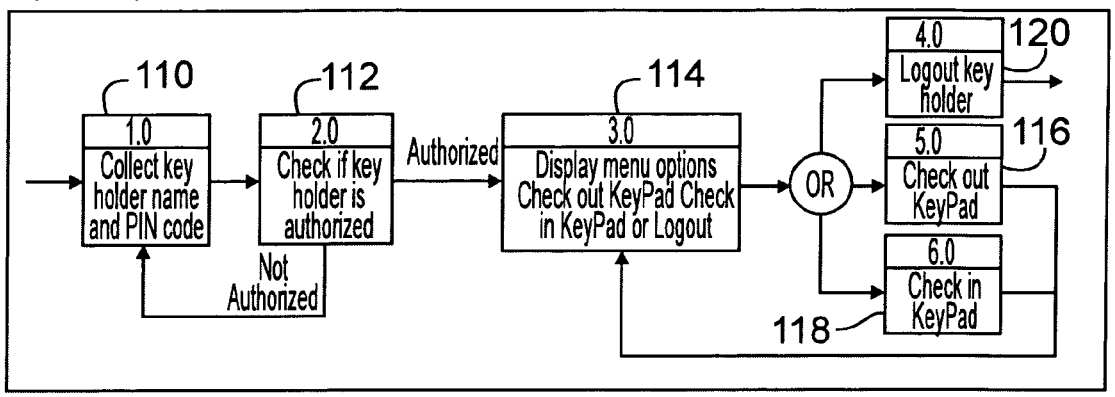
FIGS. 5–7 are flow charts showing operational aspects of the key management system related to the central computer, programming base and key pad according to the functions available for the salesperson.
Figure 6:
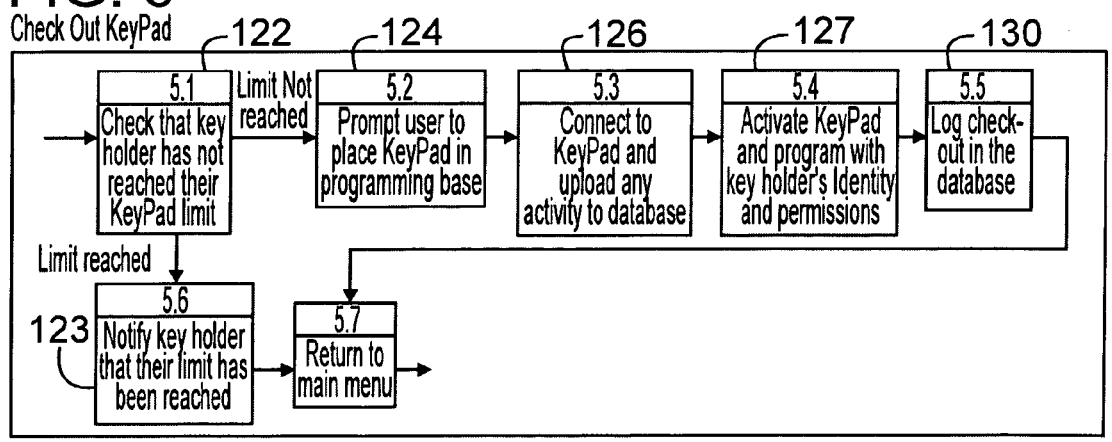
Figure 7:
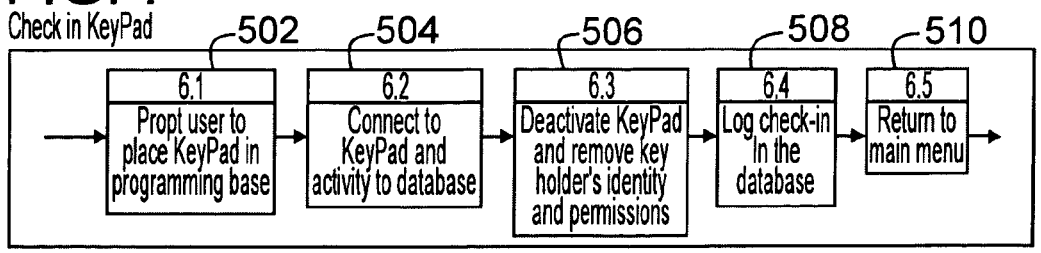

FIGS. 5–7 are flow charts showing the steps involved in "checking out" or "checking in" a key pad 16.

According to FIG. 5, the user uses the central computer 21 to access the system program. In step 110, the user is prompted for identifying information, such as her name and PIN code. In step 112, it is determined whether the user is authorized. If the user is not authorized, the process is halted.

If the user is authorized, the user's record is retrieved from the database and a menu of options available to the particular user is displayed (step 114). For example, if the user is a salesperson, the displayed options may include "Check out Key Pad" (step 116), "Check in Key Pad" (step 118) and "Log out" (step 120). If the user selects "Log out" (step 120), the process is halted.

If the user selects "Check out Key Pad," the process proceeds to the steps shown in FIG. 6. In step 122, it is determined whether the user has exceeded a number of checked out key pads limit. The system may be programmed to allow the user to have more than one key pad 16 checked out at one time to account, e.g., for occasions when the user may have forgotten to return the key pad 16 at the end of her previous shift or beginning of the current shift. If the user has reached the checked out key pads limit, a suitable message is displayed (step 123), the check out process is halted, and the process returns to step 114.

If the user has not reached the checked out keypads limit, she is prompted to place a key pad 16 in the programming base 22 (step 124). In step 126, the user selects a key pad 16 and links it to the programming base 22, e.g., by physically connecting it to the programming base 22. In step 128, any previous activity information stored in the key pad 16 is uploaded to the database and the key pad 16 is activated for the particular user in accordance with the user's predetermined privileges from her record. Advantageously, the user can select any one of a number of available key pads, since the selected one will be reprogrammed for her according to her identity and privileges. Alternatively, some or all users may retain possession of specific key pads 16 that have been assigned to them, but will still need to follow generally the same steps for periodic reauthorization.

In step 130, the user's record is updated to reflect that the assigned key has been checked out to the user.

Following step 114 in FIG. 5, if the user selects "Check in Key Pad," the process proceeds to FIG. 7. In step 502, the user is prompted to link her checked out key pad 16 to the programming base 22. After the key pad 16 is linked, any access information stored in its memory is uploaded to the database (step 504). In step 506, the key pad 16 is deactivated, and the user's identity and privileges may be erased from memory. In step 508, the user's record is updated to reflect that she checked in the key pad 16. In step 510, check in is completed and the process returns to displaying the menu (step 114 of FIG. 5).

According to an alternative check in procedure, user log in is not required. Rather the key pad 16 is linked to the programming base 22 and the system is instructed to check in the keypad 16.

Administrator Functions

Figure 8:
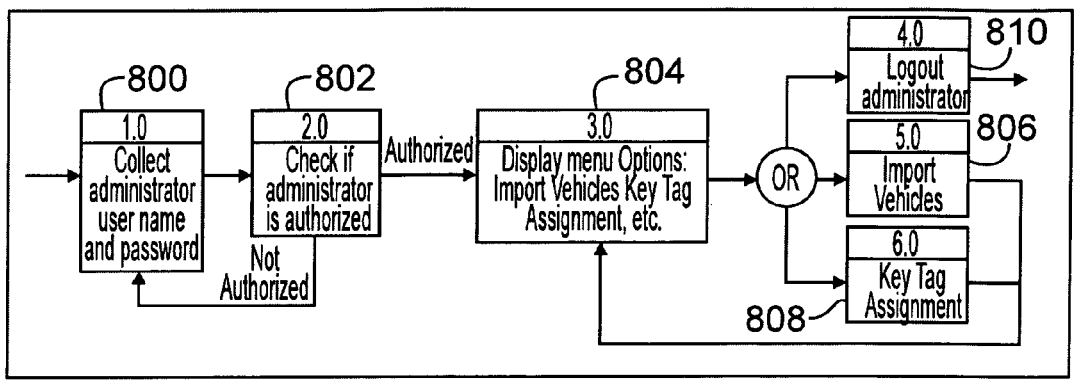
FIGS. 8–10 are flow charts showing operational aspects related to the central computer, programming base and key pad according to the functions available to an administrator.
Figure 9:
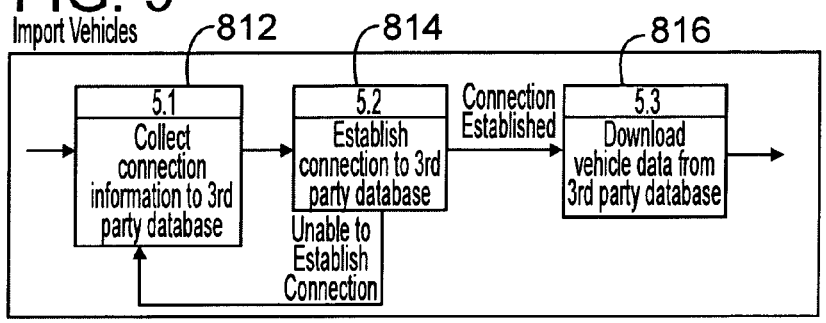
Figure 10:
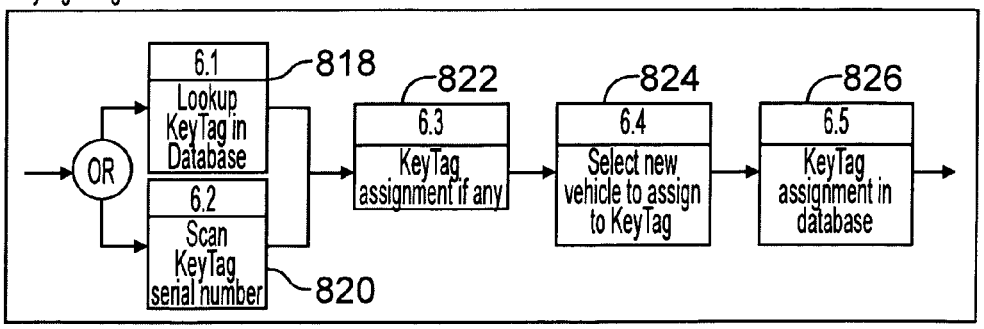

Certain functionality is reserved for system administrators. FIGS. 8–10 are flow charts showing the steps associated with some of these functions.

In FIG. 8, the administrator uses the central computer 21 to change vehicle inventory information, in this case to add a new vehicle. It is also possible, of course, to follow a similar procedure to reflect that a vehicle is no longer in inventory (e.g., after it is sold), which would include "unassigning" the key tag 18.

In step 800, the administrator is prompted to enter her identification information, e.g., her username and password. In step 802, it is determined whether the administrator is authorized. If the administrator is not authorized, the process is halted.

In step 804, a menu of administrative options available to the administrator is displayed, such as "Import Vehicles" (step 806), "Key Tag Assignment" (step 808) and "Logout" (step 810). If "Logout" (step 810) is selected, the process returns to the original login screen (step 800).

If "Import Vehicles" (step 806) is selected, the process proceeds to the steps shown in FIG. 9. It would, of course, be possible to manually enter the vehicle information rather than importing it. In step 812, the administrator is prompted to select or enter information identifying a third party database, such as a customer relationship management (CRM) database, from which information about the new vehicles to be added to the dealership inventory is to be retrieved. In step 814, the computer 20 attempts to establish a connection with the desired third party database. If efforts to make the connection are unsuccessful, the process is halted.

If the connection is established, the process proceeds to step 816, and data corresponding to the desired new vehicle is downloaded from the third party database to the database for the system 10.

If "Key Tag Assignment" (step 808) is selected, the process proceeds to the steps shown in FIG. 10 to allow the administrator to assign a key tag 18 to the vehicle keys 12 for a particular vehicle. The administrator is prompted to choose between looking up the key tag 18 by typing in the serial number of the key tag (step 818), or scanning the key tag 18 electronically to determined its serial number (step 820). Scanning may be accomplished using a key tag reader (not shown) connected to the central computer 21.

If the key tag is currently assigned, information for the currently assigned vehicle is displayed (step 822). In step 824, the administrator is prompted to select a vehicle to which the key tag is to be assigned. In step 826, the new key tag assignment information is stored in the system database.

Usage Among Various Classes of Users

Figure 12:
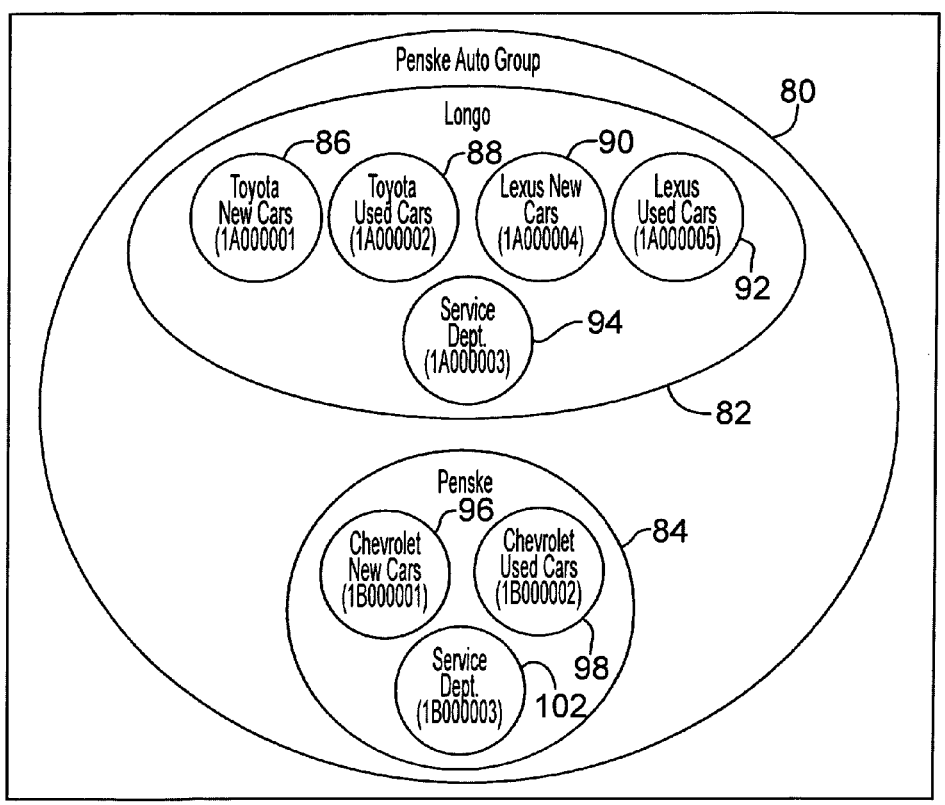
FIG. 12 is a schematic view showing an implementation of the system configured for use by multiple dealerships belonging to a single "group," and among various departments within each dealership.

FIG. 12 is a schematic diagram showing how the system 10 may be configured to provide and restrict privileges according to a user's class within an organization, in this case the user's department within the dealership or the user's role within the larger dealership group.

As illustrated, there is an overall dealer group 80 that includes a first dealership 82 and a second dealership 84. The first dealership 82 has five departments: a Toyota New Cars Department 86, a Toyota Used Cars Department 88, a Lexus New Cars Department 90, a Lexus Used Cars Department 92, and a Service Department 94. The second dealership has three departments: a Chevrolet New Cars Department 96, a Chevrolet Used Cars Department 98, and a Service Department 102.

A first dealership 82 salesperson may have privileges to access vehicles in only a single sales department, such as the Toyota New Cars Department 86, or in multiple departments, such as the Toyota New Cars Department 86 and the Toyota Used Cars Department 88. Similarly, an employee of the service department 94 may be granted privileges only to access vehicles assigned to that department.

A first dealership 82 administrator, however, may be granted privileges across as many as all five departments. Similar assignments of privileges to one, more than one or all departments are possible in the second dealership 84.

In the case where the first dealership 82 and the second dealership 84 are related as members of the auto group 80, there may be a class of users who are authorized for access across one or more departments in both dealerships, such as the owner (privileges to access vehicles in all departments) and the new car sales manager (privileges for the new car departments 86, 90 and 96). Other combinations of privileges are, of course, possible.

Exemplary Screen Displays

FIGS. 13–18 are exemplary screen displays showing the administration of the system with respect to the privileges assigned to particular classes of users. These displays may be available on the central computer 21 and/or on one of the remote computers 24.

FIG. 13 is a screen display available to a corporate administrator for a dealership showing the user configuration record for one of the dealership's employees, Nellie Frost. As indicated, Nellie belongs to a class called "local administrator" at Lot 2. Her login ID and password are indicated in the upper right hand corner.

According to the checked boxes at the left hand portion of the screen, Nellie is entitled to access only Lot 2 vehicles assigned to the "new" and "used" categories. At the lower right hand portion of the screen display, the checked boxes indicate that Nellie's privileges, for Lot 2, include: editing all records, programming devices and viewing reports.

FIG. 14 is a screen display available to Nellie Frost as a local key administrator, showing the user configuration record for another employee, Frank Snipes. As indicated, Frank Snipes is the Sales Manager for Lot 2, and he has been assigned privileges to access Lot 2 vehicles in the "new" category, to view reports and to view screens (without editing).

FIG. 15 is a screen display available to Nellie Frost as she sets the privileges available to a new employee, i.e., Salesperson 1 at Lot 2. As illustrated, Salesperson 1 has been granted privileges to access vehicles at Lot 2 in the "new" category from Monday through Friday during a shift from 8:00 (8:00 am) to 17:00 (5:00 pm). Salesperson 1's PIN code has been set as indicated to "1122." According to the screen display, Salesperson 1 has one key pad, i.e., with the identifier 645598, checked out.

FIG. 16 is a screen display available to Nellie Frost as she sets the privileges available to another new employee, i.e., Service Technician 1 at Lot 2. As illustrated, Service Technician 1 has privileges to access vehicles at Lot 2 in the "service" category from Monday through Friday during a shift from 6:00 (6:00 am) to 15:30 (3:30 pm), but only up to maximum of 25 vehicles per assigned key pad. Service Technician 1's PIN code has been set as indicated to "4321." According to the screen display, Service Technician 1 has one key pad, i.e., with the identifier 645599, checked out.

FIG. 17 is a screen display showing the user configuration for Tom Smith, the dealership owner. Tom Smith divides his time among three different lots, and thus his access privileges extend to each of those lots as indicated. Tom Smith may access vehicles at all hours and on all days. The lower right portion of the screen display indicates that Tom Smith has two key pads 16 currently in use, perhaps because he inadvertently failed to check one in after a previous use.

If Tom Smith happened to arrive at Lot 3 without remembering his assigned key pad, he could check out another key pad because he is not limited to a maximum number of key pads.

FIG. 18 is a screen display showing the user configuration for Jim Jones, which has been reprogrammed in anticipation of a special event, e.g., a sale of vehicles pooled from several lots. Jim Jones, who customarily works only in Lot 1, has been granted privileges to access new vehicles from Lot 2 and Lot 3 for the sale during the time shown. Following the sale, the key administrator can easily reprogram Jim Jones' privileges for normal access to Lot 1.

Reports

As indicated, the system 10 allows various types of reports to be generated, provided the requesting person has appropriate privileges. Any such report can be generated in a printed or electronic form, and can be used on-site or automatically transmitted to a remote location, by e-mail or other form of transmission.

For example, an administrator can generate a report from the database of activity from all users (or "key holders"), or some class of users. This report would normally include, for a desired time frame, the user's identifying information, identification of the assigned key pad, the vehicles that were accessed, the date and time of the access, and the usage code associated with the access.

It is also possible to generate a recent vehicle activity report sorted by the vehicles in inventory. This report provides information on the last several accesses of each vehicle, such as which user made the access, the time and date the access was made and the purpose of the access. This report might be used, e.g., in tracking unreported damage to a vehicle that is discovered at a later time.

For any specific vehicle, a similar report showing information about the last several accesses is available in the field, if authorized, by linking a key pad 16 to the key container 14 and requesting it. The report is viewed on the key pad 16 and/or on the key container, depending upon the particular implementation.

Other report formats include:
- a vehicle history report for one or more vehicles showing the stored access information, which can be sorted by time, vehicle ID or purpose (usage code)
- a key pad assignment report showing which key pads were assigned to which user and over what time period
- a key pad programming report showing when and by whom key pads were checked out and checked in
- a key pad exception report showing key pads that have not been assigned/had activity recently, and key pads that have been assigned but have not been checked in
- an outstanding vehicle keys report that allows an administrator to verify that all vehicle keys have been returned to central storage, e.g., at the end of the business day. If a vehicle appears in this report, the respective vehicle keys have not been returned. Similarly, an outstanding key pad report lists the keys that have not been checked in
- an inventory report showing all key containers, key pads and key tags by, e.g., their respective serial numbers and status
- a reconciliation report showing key tags that remain assigned to vehicles that have been sold and vehicles to which no key tag has been assigned
- user configuration report showing the complete set of assigned privileges for a specific user or a group of users.

The above report formats are exemplary only, and other report formats would of course be possible.

Major Components

Additional details regarding major components of the system 10 are described below.

Key Pad

The access device or key pad 16 may be a device similar to the present assignee's DisplayKEY or a similar device, except that it may be programmed to expire after a shorter operating period (e.g., the length of a shift in the case of a key pad 16 assigned to a salesperson) and it may have non-rechargeable batteries. Each key pad 16 is usually assigned a unique serial number that is recorded in the database.

In the illustrated implementations, the key pad 16 is linked with other devices to exchange information via a physical electrical connection, i.e., electrical contacts of the key pad 16 physically contact and form an electrical connection with corresponding contacts of the key container 14 or of the programming base 22. Other linking technologies are also available, including those that do not require a physical connection between the devices, such as infrared, radio frequency, etc.

Key Container

Figure 11A:
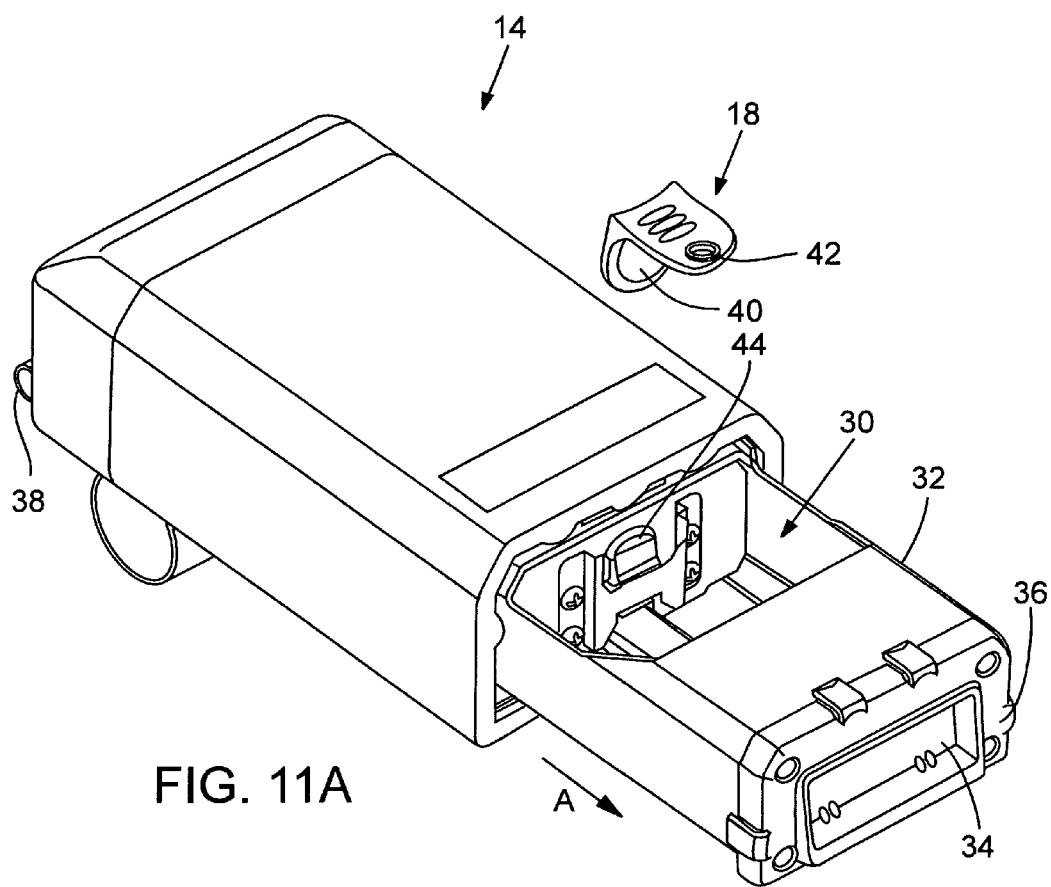
FIG. 11A is a perspective view of an exemplary key container in an unlocked position which shows the key set storage area and a representative key tag.

One specific implementation of the key box or key container 14 is shown in FIG. 11A. The key container 14 has a key set storage area 30 capable of accommodating the key set 20, which as shown in FIG. 1 may include one or more vehicle keys 12, the key tag 18 and its attachment, and, in some cases, the conventional electronic key fob 13 (or "remote") provided with the vehicle keys 12.

The key set storage portion 30 is defined in a movable portion 32 of the key container 14. The movable portion 32 is released to slide downwardly as indicated by arrow A when the key container 14 is unlocked.

The key container 14 has a key pad interface portion 34 shaped to receive and establish electrical contact with the key pad 16. In the illustrated implementation, the keypad interface portion is defined in a lower end 36 of the movable portion 34.

The key container 14 includes a microprocessor-based circuit that includes a memory and a solenoid that is selectively controllable to "unlock the lock," i.e., to release the movable portion 32. Motors, magnets or other similar devices could be used in place of the solenoid. The circuit in the key container 14 is normally configured to receive power from a linked key pad 16, so no separate power source within the key container 14 is required.

In some implementations, and possibly if infrared, RF or other wireless communication capability between the access device and the key container 14 is provided, there may be a dedicated power source for the key container circuit.

The key container 14 has an attachment portion for attaching the key container 14 to a secure object. In the illustrated implementation, the attachment portion is a hanger 38 shaped to slide over the edge of the glass in a partially open vehicle window to support the key container 14. The window can then be closed to prevent a thief from simply removing the key container from an unattended vehicle.

Other implementations of the key container 14 may have a door or other structure that selectively allows access to the key set storage portion 30, instead of the drawer-like arrangement shown in the figures.

Key Tag

Also shown in FIG. 11A is a specific implementation of the key tag 18. The key tag 18 has an identifier element 40 that can be can be electronically read and an eyelet 42 to allow the key tag 18 to be attached to the vehicle keys 12. Although not shown, the attachment between the key tag 18 and the vehicle keys 12 is preferably tamper-evident, but sufficiently strong to avoid the efforts of a casual intermeddler.

One suitable identifier element 40 is the iButton® available from Dallas Semiconductor. A suitable reader for reading the serial number from the identifier element 40 is also available from Dallas Semiconductor.

In the illustrated implementation, presence of the key set 20 in the key container 14 is detected by presence of the key tag 18. Specifically, there is a key tag receiving portion 44 defined in the key set storage portion 30 of the key container. When the key tag 18 is received in the key tag receiving portion 44, the identifier element 40 completes a circuit in the key container. FIGS. 11B and 11C show the key set 20 with an attached key tag 18 being slid into the key tag receiving portion for storage. FIG. 11D shows the key container 14 in the process of being moved to the closed position.

The key container 14 can be configured to allow it to be locked only when the key set 20 is present in the key container 14. In the illustrated implementation, the movable portion 32 cannot be returned to its closed position unless the key tag 18 is received in the key tag receiving portion 44. In some situations, such as during shipping, the key tag receiving portion may be loaded with a dummy or place holder key tag 16 to allow the key container to be closed.

The above implementations refer to the secure and remote storage of keys, and particularly, vehicle keys. It is of course expected that the same concepts could be used to manage other types of assets.

Having illustrated and described the principles of our invention with reference to several exemplary embodiments, it should be apparent to those of ordinary skill in the art that the invention may be modified in arrangement and detail without departing from such principles. We claim all such modifications that fall within the scope of the following claims.

We claim:

1. A key management system for controlling access to a vehicle key stored proximal to a remotely located vehicle, comprising:
    a key container located proximal to one of the remotely located vehicles, the key container having a key storage area for storing a vehicle key associated with the respective vehicle and being secured by an electronic lock, the key container having a memory;
    a key tag associated with the vehicle key, the key tag having an electronically stored identifier and being detectable by the key container when placed in the key storage area; and
    a portable electronic key transportable from a key authorization site where the key is authorized to locations of key containers to allow an authorized user to access a selected key container, the electronic key being operable to establish a communications link with the electronic lock of the key container and having a memory,
    wherein information about access events is stored in at least one of the memory of the key container or the memory of the electronic key, and
    wherein the electronic lock is prevented from being actuated to secure the key container unless the key tag is placed in the key storage area.

2. The key management system of claim 1, wherein the portable electronic key supplies electrical power to the key container.

3. The key management system of claim 1, wherein the user establishes a physical communications link between the portable electronic key and the key container when attempting access.

4. The key management system of claim 1, wherein the memory of the key container stores at least the identifier of the key tag.

5. The key management system of claim 4, wherein the memory of the key container includes a lock out list identifying an unauthorized portable electronic key or an unauthorized user.

6. The key management system of claim 1, wherein the memory of the portable electronic key records the approximate time that a successful access was made.

7. The key management system of claim 1, wherein the key container includes an attachment portion shaped to allow the key container to be supported over an edge of a window in the vehicle.

8. The key management system of claim 1, wherein the portable electronic key is programmed with access privileges corresponding to the user's identity.

9. The key management system of claim 1, wherein the key container cannot be accessed by the portable electronic key unless the user validates his identity.

10. The key management system of claim 1, wherein the memory of the portable electronic key includes stored privileges, and wherein at least some of the privileges are set to expire periodically.

11. The key management system of claim 1, further comprising a central computer and an associated database for administering the key management system, the central computer allowing an administrator to set the user's access privileges and track the user's access activity.

12. The key management system of claim 11, wherein the user logs into the central computer to reestablish his expired access privileges.

13. The key management system of claim 1, wherein the user seeking to access the key container uses the portable electronic key to communicate the user's identifying information and to select one of a predetermined group of codes corresponding to the purpose of the access.

14. The key management device of claim 1, wherein the portable electronic key includes a key pad input device, a display and exposed electrical contacts connectible to the key container to establish a communications link between the key pad and the key container.

15. The key management system of claim 1, wherein the key tag comprises an electrical contact portion, and wherein the key container is capable of communicating with the key tag when the electrical contact portion of the key tag is placed in the key storage area to complete an electrical circuit of the key container.

16. The key management system of claim 1, wherein the portable electronic key communicates with the key container via infrared, radio frequency or other wireless transmission mode.

17. The key management system of claim 1, wherein information, including key tag identifying information, is relayed to an authorization site via the key container and the portable electronic key.

18. A key management system for controlling access to vehicle keys, comprising:
    a key set that includes a vehicle key to a particular vehicle and a key tag associated with the vehicle key, the key tag having an electronically readable identifier stored thereon and an electrical contact portion;
    a key container that can be located on or near the vehicle, the key container having a key set storage area secured by an electronic lock, the key container operable to detect the key set when the key set is properly stored in the key set storage area; and
    a portable electronic access device carried by a user to access the key container, the access device having a memory that is updated with at least the identifier of the key tag when the key container is successfully accessed and the key set is removed from the key set storage area, wherein the access device is programmed to expire periodically, and wherein information stored in the memory of an expired access device is automatically uploaded to a database.

19. The key management system of claim 18, wherein the information stored in the memory of an expired access device is automatically uploaded to a database when the access device is reauthorized.

20. A key management system for controlling access to a vehicle key stored proximal to a remotely located vehicle, comprising:
    an authorization site;
    a key tag associated with a vehicle key and operable to record access event information during an access or attempted access of the vehicle key;
    a key container operable to read information stored in the key tag; and
    a portable electronic key operable to transport stored information received from the key tag between the key container at a first location and the authorization site at a second location.

* * * * *